C. W. WALTERS.
PUSH BUTTON OPERATING DEVICE FOR AUTOMOBILE STEERING WHEELS.
APPLICATION FILED JULY 14, 1919.
1,381,259.
Patented June 14, 1921.
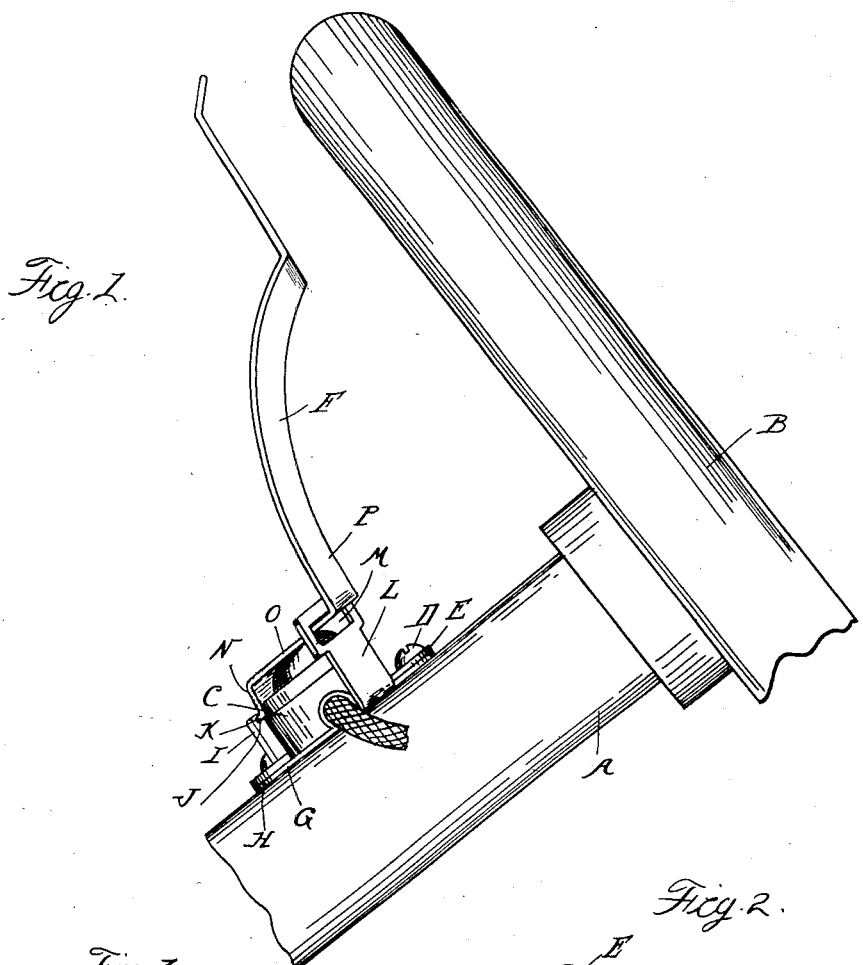
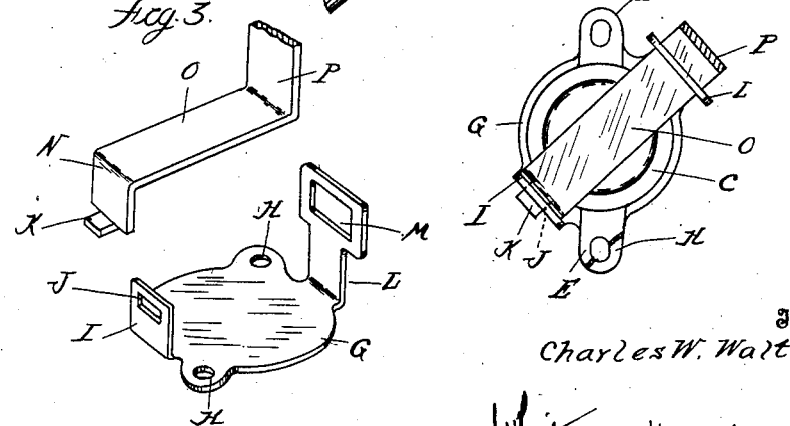
Inventor
Charles W. Walters

UNITED STATES PATENT OFFICE.

CHARLES W. WALTERS, OF DETROIT, MICHIGAN.

PUSH-BUTTON-OPERATING DEVICE FOR AUTOMOBILE STEERING-WHEELS.

1,381,259.

Specification of Letters Patent. Patented June 14, 1921.

Application filed July 14, 1919. Serial No. 310,845.

*To all whom it may concern:*

Be it known that I, CHARLES W. WALTERS, a citizen of the United States of America, residing at Detroit, in the county of Wayne and State of Michigan, have invented certain new and useful Improvements in Push-Button-Operating Devices for Automobile Steering-Wheels, of which the following is a specification, reference being had therein to the accompanying drawings.

The invention relates to alarm operating devices for use on motor vehicles, being more particularly designed for use as an attachment to Ford cars. With this type of car it is usual to mount a push button upon the forward side of the non-rotating steering stem, but this requires the operator to remove his hand from the steering wheel in order to operate the button. With my improvement the button may be actuated by the hand of the operator while still grasping the wheel.

In the drawings:

Figure 1 is a side elevation of the steering wheel showing my attachment applied thereto;

Fig. 2 is a plan view of the push button and operating attachment;

Fig. 3 is a perspective view of the members constituting the attachment detached.

A is the non-rotating stem forming the mounting for the steering wheel B, and C is the push button mounted on the stem. It is usual to attach the button to the stem by screws D which pass through ears E projecting from opposite sides of the push button housing.

My attachment comprises a lever F which is pivoted adjacent to the push button and extends over the same in contact therewith, the outer end of said lever extending to a point adjacent to the rim of the wheel. To facilitate the mounting of this lever I have provided a fulcrum member G which has a base portion adapted to be placed beneath the base of the push button and having apertured ears H for registration with the ears E and for engaging the screws D. The member G is also provided with an outwardly-extending portion I, which is apertured at J to receive a lug or finger K at the end of the lever F and upon the opposite side of the base the member G is provided with an outwardly projecting portion L apertured at M to form a guide loop through which the lever F passes. The lever F, as shown, is formed with a portion N from which the lug K projects and extending outward at one side of the push button housing. Also the portion O passing over the button has the angling portion P beyond the loop end and which extends radially outward from the stem A and upward toward the rim of the wheel. Thus the outer or operating end of the lever F will be in convenient position for actuation by the hand of the operator when engaging the wheel.

To apply my improvement to the standard construction it is only necessary to remove the screws D, slip the push button between the member G and the lever F and then secure the parts by again tightening the screws D, these passing through the registering apertured ears H and E.

The members F and G are preferably sheet metal stampings which can be manufactured at small cost.

What I claim as my invention is:

1. The combination with a steering wheel and a nonrotating stem therefor, of a push button mounted on the stem, a member positioned between the push button casing and the stem and provided with oppositely disposed projections, one of which has a pivot slot and the other of which has a guide slot, and a lever formed at one end to interlock with the pivot slot and arranged to play in the guide slot, the push button normally maintaining the lever at the outer limit of its throw and the outer extremity of the lever forming a hand hold in close proximity to the hand rim of the wheel.

2. The combination with a steering wheel and a non-rotating stem therefor, of a push button mounted on said stem being provided with apertured ears on diametrically opposite sides thereof with securing screws therefor, and an operating attachment for said push button comprising a member having a base portion passing beneath the base of the push button and provided with registering apertured ears, said member having outwardly projecting portions on diametrically opposite sides thereof, and a lever engaging an aperture in one of said outwardly projecting portions and passing through a loop in the other of said outwardly projecting portions, said lever passing in operative contact with said push button and extending therefrom to a point in proximity to the rim of the wheel.

In testimony whereof I affix my signature.

CHARLES W. WALTERS.